United States Patent
Jang et al.

(10) Patent No.: US 8,161,141 B2
(45) Date of Patent: Apr. 17, 2012

(54) SERVER, SYSTEM AND METHOD FOR PROVIDING DYNAMIC DOMAIN NAME SERVICE

(75) Inventors: Gwang-whoon Jang, Changwon (KR); Yong-kwang Won, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 168 days.

(21) Appl. No.: 12/425,566

(22) Filed: Apr. 17, 2009

(65) Prior Publication Data

US 2010/0057893 A1    Mar. 4, 2010

(30) Foreign Application Priority Data

Aug. 29, 2008  (KR) .................. 10-2008-0085522

(51) Int. Cl.
- *G06F 15/177* (2006.01)
- *G06F 15/173* (2006.01)
- *G06F 15/16* (2006.01)

(52) U.S. Cl. .................. 709/221; 709/224; 709/245

(58) Field of Classification Search .................. 709/221, 709/224, 245

See application file for complete search history.

(56) References Cited

U.S. PATENT DOCUMENTS

| | | | |
|---|---|---|---|
| 2002/0124060 A1* | 9/2002 | Jinzaki | 709/219 |
| 2003/0177236 A1* | 9/2003 | Goto et al. | 709/225 |
| 2008/0111683 A1* | 5/2008 | Hershkovitz et al. | 340/541 |
| 2010/0121932 A1* | 5/2010 | Joshi et al. | 709/207 |

FOREIGN PATENT DOCUMENTS

| | | |
|---|---|---|
| JP | 11-110324 A | 4/1999 |
| JP | 2004-046504 A | 2/2004 |
| JP | 2006-171989 A | 6/2006 |
| KR | 10-2006-0025867 A | 3/2006 |

* cited by examiner

*Primary Examiner* — Karen Tang
*Assistant Examiner* — Cheikh Ndiaye
(74) *Attorney, Agent, or Firm* — Drinker Biddle & Reath LLP

(57) ABSTRACT

Provided are a server, a system, and a method of distributing a load caused by health checks in a dynamic domain name server (DDNS) by separating a health check unit which causes the most load on the dynamic domain name server and a unit for processing a client query and registering equipment. The dynamic domain name server (DDNS) includes a main dynamic domain name server (DDNS that registers an identifier and a dynamic IP address for a piece of the equipment and responds to a client query request with the dynamic IP address of the piece of equipment; and at least one sub-DDNS for updating a status of the piece of equipment in response to a status notifying message sent from the piece of equipment.

10 Claims, 7 Drawing Sheets

SERVER, SYSTEM AND METHOD FOR PROVIDING DYNAMIC DOMAIN NAME SERVICE

CROSS-REFERENCE TO RELATED PATENT APPLICATION

This application claims the benefit of Korean Patent Application No. 10-2008-0085522, filed on Aug. 29, 2008 in the Korean Intellectual Property Office, the disclosure of which is incorporated herein in its entirety by reference.

BACKGROUND OF THE INVENTION

1. Field of the Invention

The present invention relates to a server, system, and method for providing an IP address of equipment that uses a dynamic IP address.

2. Description of the Related Art

With the development of communication technology, various services are provided using remote equipment. To access remote equipment that is connected to a network, an internet protocol (IP) address is needed. Clients can access desired equipment via IP addresses. In general, an IP address is expressed by a series of numbers. Each of the clients can access the equipment through a domain name that is formed of a combination of more readable alphabets and numbers, instead of directly inputting the IP address of the clients. A domain name service that maps each domain name with an IP address is required so that the clients can respectively access equipment through domain names.

Many pieces of equipment have a dynamic IP address that changes with time. Accordingly, each piece of equipment has a regular domain name but different IP addresses over time. The client may access equipment having a dynamic IP address by receiving the dynamic IP address of the equipment from a dynamic domain name service (DDNS) that maps the domain name of the equipment and the IP address thereof.

A DDNS registers a plurality of pieces of equipment and performs a health check to update dynamic IP addresses of each piece of equipment and check the status of the equipment. A health check is conducted after the equipment notifies the DDNS of the status of the equipment periodically, and the DDNS updates the status of each piece of equipment in response to the status notification.

SUMMARY OF THE INVENTION

The present invention provides a dynamic domain name server, wherein a unit for conducting a health check and a unit for registering equipment and processing client queries are separated, thereby distributing a load that is caused by the health check in the dynamic domain name server.

The present invention also provides a dynamic domain name server which is capable of dynamically increasing the capacity of the server as the number of pieces of equipment increases in order to solve the problem of shortage of capacity of the server in accordance with the increase in the number of pieces of equipment registered to the dynamic domain name server and distribute the load caused by the increased number of pieces of equipment.

According to an aspect of the present invention, there is provided a dynamic domain name server (DDNS) comprising: a main dynamic domain name server (DDNS) for registering equipment and responding to a client query that requests a dynamic IP address of the equipment; and at least one sub-DDNS for updating the status of the equipment in response to a status notifying message sent from the registered equipment. The main DDNS may comprise: a sub-DDNS allocation unit for allocating a sub-DDNS to the equipment; and a sub-DDNS notifying unit for notifying the equipment about a message including an address of the allocated sub-DDNS. The main DDNS may include a main database including an identifier, an IP address, and the status of each of a plurality of pieces of equipment, and the at least one sub-DDNS may include a sub-database including an identifier, an IP address, a survival count, and a status of the equipment allocated to each sub-DDNS, wherein the DDNS further comprises a synchronization unit that synchronizes the main database and each of the sub-databases.

The main DDNS may activate at least one other preliminary DDNS when the number of pieces of equipment processed in the at least one of the sub-DDNS exceeds a reference value. The main DDNS may generate a warning message when the number of pieces of equipment processed in the at least one of the sub-DDNS exceeds a reference value.

Each of the at least one sub-DDNS may include a time-out processing unit that periodically increases a survival count of each equipment registered in each of the sub-DDNS and converts the status of the equipment, whose survival count exceeds a reference value, to an inactive status.

Further, each of the at least one sub-DDNS may include a reregistering unit outputting a re-registration message that is configured to reregister the equipment to the main DDNS when a survival count of the equipment transmitting the status notifying message exceeds a reference value or the status of the equipment is in an inactive status, and the main DDNS reregisters the equipment according to the re-registration message.

According to another aspect of the present invention, there is provided a system for supporting a dynamic domain name, the system comprising: equipment; a client; and a dynamic domain name server (DDNS), wherein the DDNS comprises: a main dynamic domain name server (DDNS) that registers equipment and responds to a client query that requests a dynamic IP address of the equipment; and at least one sub-DDNS that updates the status of the equipment in response to a status notifying message sent from the registered equipment. The equipment may transmit a status notifying message to an address of the notified sub-DDNS.

According to another aspect of the present invention, there is provided a method for supporting a dynamic domain name, the method comprising: registering equipment to a main database in response to a register request from the equipment; allocating a sub-DDNS that updates the status of the equipment in response to a status notifying message sent from the equipment; and notifying the equipment about an address of the DDNS allocated to the equipment. The method may further comprise periodically synchronizing the main database and a database of the sub-DDNS.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Terms used throughout the specification are defined as follows.

A server refers to equipment for or an action of receiving an access request from a client, allowing the access, performing a command, and returning a result of the command being performed.

A dynamic domain name service is a service that maps dynamic IP addresses, which change over time, with domain names.

A dynamic domain name server (DDNS) is software or equipment thereof that performs a DDNS function.

Equipment refers to devices such as an IP camera, a video server, a digital video recorder (DVR) and so forth, that uses a dynamic domain name service.

A client refers to a user who requests access to a dynamic domain name server.

A health check refers to signals or action of communicating between a dynamic domain name server and the equipment to notify whether equipment is operated normally.

A health check interval is a period during which a health check is periodically conducted.

A status notifying message is a packet that is transmitted and received between equipment and a dynamic domain name server during a health check.

A query is an act of inquiring about a search result corresponding to a predetermined condition in an application using a database.

The present invention will now be described more fully with reference to the accompanying drawings, in which exemplary embodiments of the invention are shown. The description and attached drawings are for the purpose of understanding the prevent invention, and elements that are easily realizable by one of ordinary skill in the art may be omitted.

Also, the specification and the drawings are not intended to limit the present invention and the scope of the prevent invention should be defined by the attached claims. The meanings of the terms used in the specification of the present invention should be construed as meanings and concepts not departing from the spirit and scope of the invention based on the principle that the inventor is capable of defining concepts of terms in order to describe his or her invention in the most appropriate way.

Figure 1:
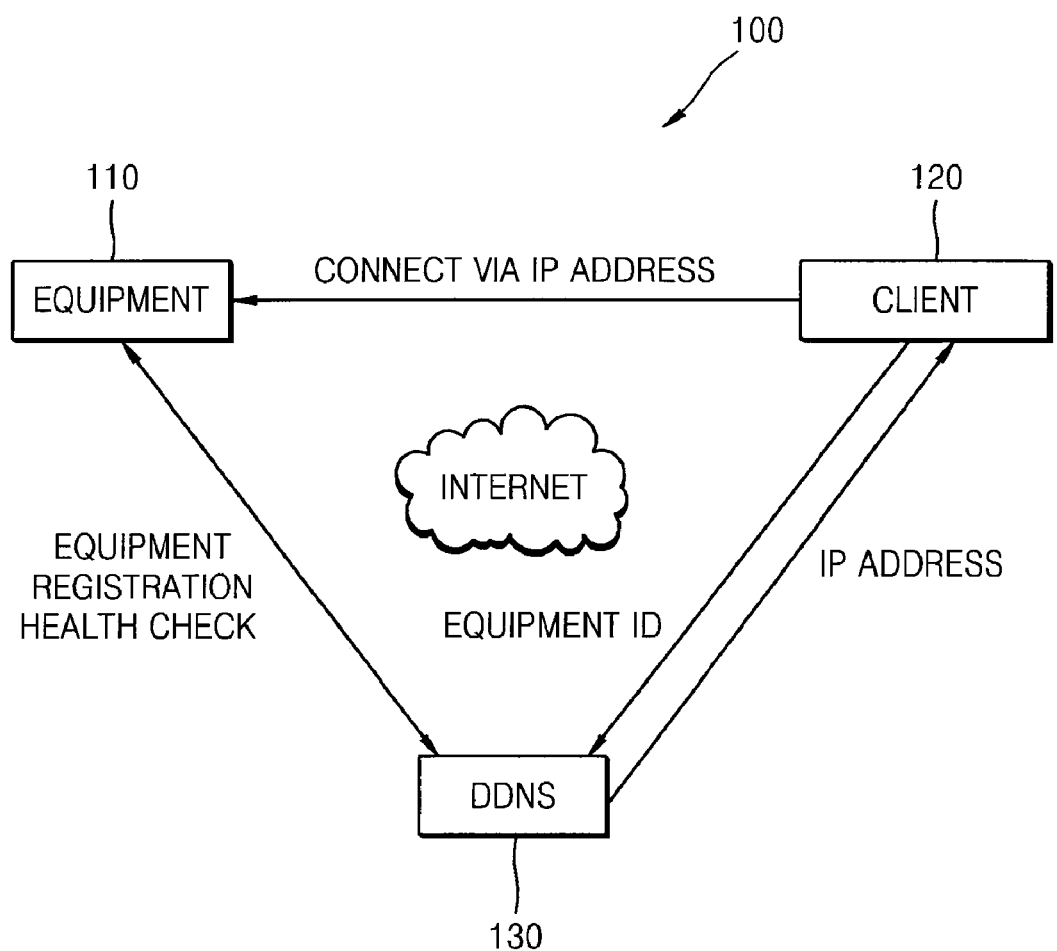
FIG. 1 illustrates a dynamic domain name support system to which a dynamic domain name server according to the present invention can be applied.

FIG. 1 illustrates a dynamic domain name support system 100 to which a dynamic domain name server 130 according to the present invention can be applied.

The dynamic domain name support system 100 includes equipment 110 that is connected through the Internet, a client 120, and a dynamic domain name server (DDNS) 130.

The equipment 110 registers its identifier to the DDNS 130. The equipment 110 may be directly registered in the DDNS 130, or remotely registered to the DDNS 130 on the equipment 110 through the Internet. When registering the equipment 110 to the DDNS 130, the identifier and the IP address of the DDNS 130 are stored in the DDNS 130. Also, a password, position, and description about other equipment may be stored together in the DDNS 130.

The equipment 110, which is registered to the DDNS 130, periodically notifies the DDNS 130 of its status and IP status. The equipment 110 may access the DDNS 130 using the identifier and password of the equipment 110, and update the status and IP address of the equipment 110 in the DDNS 130.

Meanwhile, the client 120 that is willing to access the equipment 110 that uses a dynamic IP address transmits a client query including an identifier of the equipment to the DDNS 130 to get the IP address of the equipment 110 which the client 120 is willing to access, and accesses the equipment 110 using the IP address.

The DDNS 130 responds to a query from the client 120 and maps the identifier and the IP address of the equipment 110, and notifies the client 120 of the IP address. The DDNS 130 includes a database that stores the status and the IP address of the equipment 110. When a query is generated from the client 120, the DDNS 130 notifies the client 120 of the IP address of the equipment 110 when equipment corresponding to the query is registered and is activated.

As described above, in order to continually update the IP address of the equipment 110 having a dynamic IP address, a health check that periodically updates the status and the IP address of the equipment 110 is required. A health check that is periodically performed between the equipment 110 and the DDNS 130 is the biggest factor in increasing the load on the DDNS 130. Also, as the number of pieces of equipment 110 increases, the load caused by the health check is also increased.

To this end, according to the present invention, the DDNS 130 is divided into a main DDNS and a sub-DDNS; the main DDNS registers equipment and processes a client query, and the sub-DDNS performs a health check function, thereby distributing the load that is caused by the health check.

Figure 2:
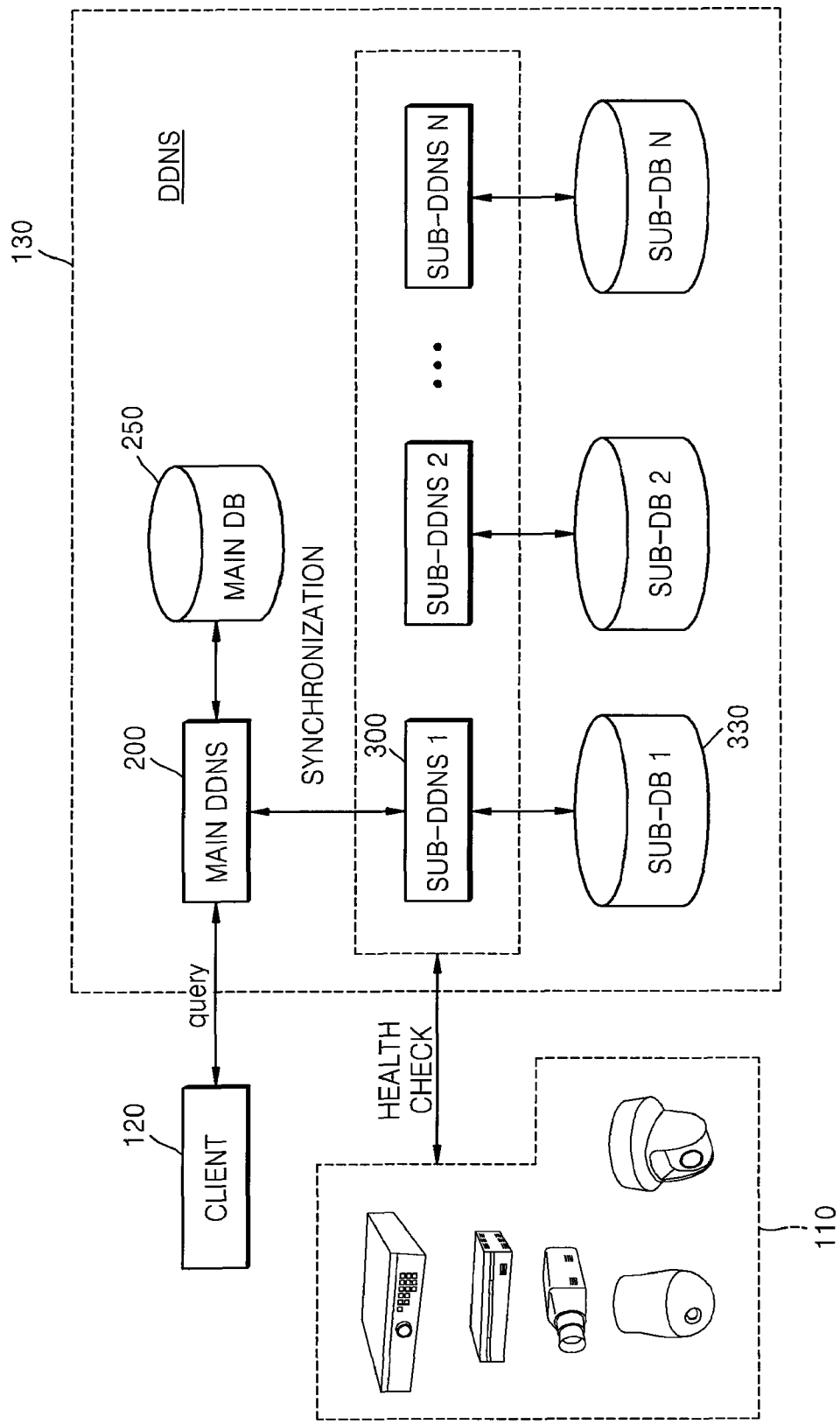
FIG. 2 is a block diagram illustrating the dynamic domain name support system of FIG. 1 according to an embodiment of the present invention.

FIG. 2 is a detailed view of the dynamic domain support system of FIG. 1.

The DDNS 130 according to the current embodiment of the present invention includes a main DDNS 200 and a sub-DDNS 300. The main DDNS 200 registers equipment and processes a client query, and the sub-DDNS 300 performs a health check function. There may be a plurality of sub-DDNS 300, and the number thereof may increase as the number of pieces of equipment increases. The main DDNS 200 and each of the sub-DDNS 300 respectively include a database 250 and 330. Also, the main database 250 of the main DDNS 200 and the sub-database 330 of the sub-DDNS 300 are periodically synchronized.

When the equipment 110 is registered to the main DDNS 200, the main DDNS allocates to the equipment 110 a sub-DDNS 300 that is to perform a health check, and notifies the equipment 110 of the address of the allocated sub-DDNS 300. After the equipment 110 is notified about the address of the sub-DDNS 300, the equipment 110 transmits a status notifying message for a health check to the sub-DDNS 300 directly, instead of the main DDNS 200.

Figure 3A:
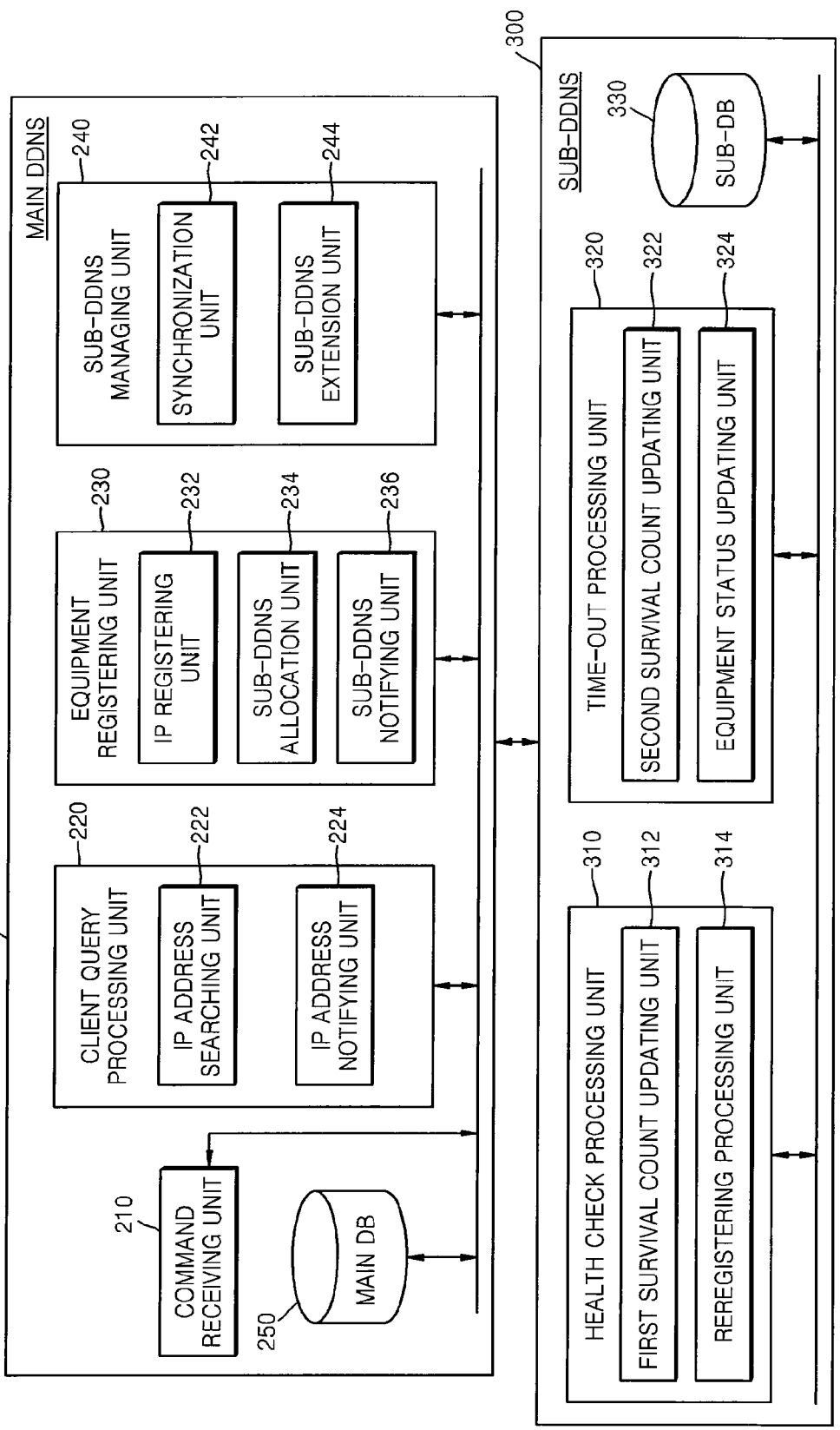
FIG. 3A is a block diagram illustrating a dynamic domain name server (DDNS) according to an embodiment of the present invention.
Figure 3B:
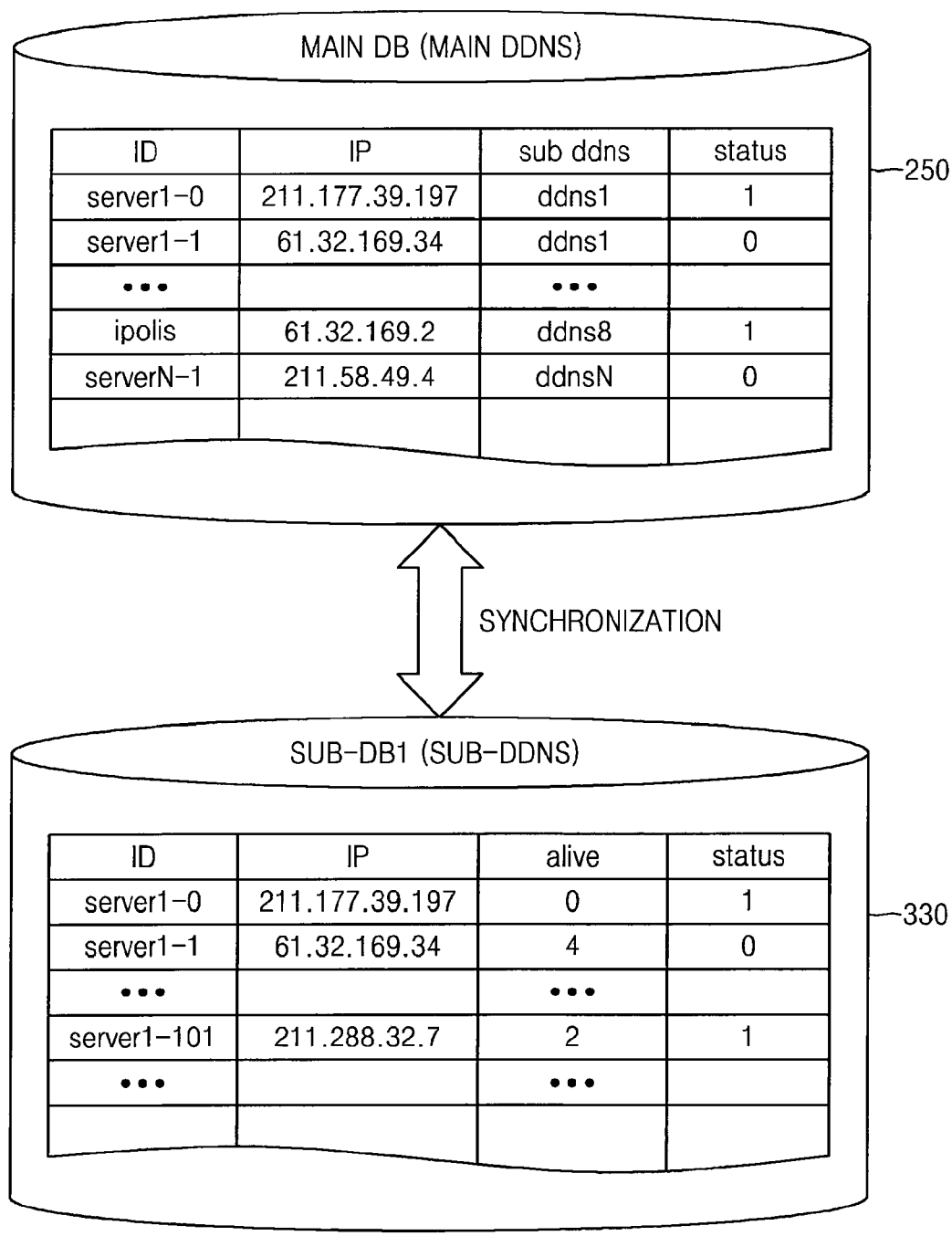
FIG. 3B illustrates data stored in a main database and in a sub-database of the DDNS according to an embodiment of the present invention.

FIG. 3A is a block diagram illustrating the DDNS 130 of FIG. 2 according to an embodiment of the present invention, and FIG. 3B illustrates data stored in a main database 250 and in a sub-database 330 of the DDNS 130.

The DDNS 130 includes a main DDNS 200 and a sub-DDNS 300.

The main DDNS 130 may include a command receiving unit 210, a client query processing unit 220, an equipment registering unit 230, a sub-DDNS managing unit 240, and a main database 250.

The command receiving unit 210 receives a command from the equipment 110 or the client 120 over a network. When the received command is a client query, the client query processing unit 220 processes the command. When the received command is a request for registering new equipment, the command is processed by the equipment registering unit 230.

The client query processing unit 220 may include an IP address searching unit 222 and an IP address notifying unit 224. The IP address searching unit 222 searches for an IP address corresponding to an identifier of equipment included in the client query from the main database 250. The IP address notifying unit 224 notifies the client 120 that has received the client query of the IP address searched for by the IP address searching unit 222.

When the client 120 sends a client query to the DDNS 130 using an Internet browser, a format of a protocol of the client query could be expressed as follows.

http://DDNS Domain(or DDNS IP address)/equipment ID

For example, when a domain of the DDNS 130 is "ddns.ipolis.com", and an identifier of the equipment 110 the client 120 is willing to access is "home", a client query the client 120 inputs is "http://ddns.ipolis.com/home". When the client 120 does not use an Internet browser to access the DDNS 130 but instead uses another application, another protocol may be defined between the application of the client 120 and the DDNS 130.

The equipment registering unit 230 may include an ID registering unit 232, a sub-DDNS allocation unit 234, and a sub-DDNS notifying unit 236. The ID registering unit 232 stores an identifier of the equipment 110 which requests a new registration of equipment to the main database 230. The sub-DDNS allocation 234 allocates a sub-DDNS 100 in which a health check regarding the equipment 110 is to be performed. The sub-DDNS allocation unit 236 notifies the equipment 110 about the address of the sub-DDNS allocated to the equipment 110. The sub-DDNS notifying unit 236 may notify health check intervals that represent periods in which the equipment 110 is to perform health checks. When the equipment 110 is notified about the address of the allocated sub-DDNS 300 and health check intervals, the equipment 110 periodically transmits a status notifying message to the corresponding sub-DDNS 300 according to the health check intervals.

A protocol between the equipment 110 and the DDNS 130 for realizing the present invention may be defined as follows.

| [command protocol] | |
|---|---|
| METHOD + VERSION\r\n | ; methods and method version |
| KEY : VALUE\r\n | ; KEY and VALUE |
| KEY : VALUE\r\n | |
| ... | |
| \r\n\r\n | ; string completion classifier |
| [response protocol] | |
| VERSION + STATUS CODE + REASON PHRASE\r\n | |
| KEY: VALUE\r\n | |
| \r\n\r\n | |

In addition, the meaning of STATUS CODE is as follows:

| STATUS CODE : 200 OK |
|---|
| 400 ERROR |

Command strings that request a new registration of equipment according to the protocol are as follows:

| DIRREGISTER BMSP/0.3\r\n | ; METHOD = DIRREGISTER |
|---|---|
| ID:sst1\r\n | ; ID of equipment registered to the DDNS server |
| PASSWORD: sst1\r\n | ; password corresponding to ID |
| IP: 211.177.39.197\r\n | ; IP Address of the equipment |
| SERIAL: 0000d120\r\n | ; Serial or MAC Address of equipment |
| PUBLICOPEN: YES\r\n | ; whether to allow other users access the equipment via homepage |
| NETTYPE:LAN\r\n | ; type of network (LAN, ADSL, or DHCP) |
| HTTP_PORT:80\r\n | ; Web port |
| STREAM_PORT:4000\r\n | ; access port of equipment |
| PLATFORM: SNS-400\r\n | ; type of equipment (Platform) |
| MAC:0001CFFFF\r\n | ; MAC Address of equipment |
| DEVNAME:NVS\r\n | ; name of device |
| \r\n\r\n | ; string completion classifier |

An example of a notification string according to the protocol that the equipment 110 is notified about by the sub-DDNS notifying unit 236 after a new registration of equipment is as follows:

| BMSP/0.3 200 OK\r\n | ; STATUS CODE and REASON |
|---|---|
| REFRESH: 3\r\n | ; Refresh Interval (minute) |
| SUB_DDNS:sddns1.ipolis.com\r\n | ; allocated sub-DDNS |
| \r\n\r\n | ; string completion classifier |

The operation of the client query processing unit 220 and the equipment registering unit 230 will be described in detail below with reference to FIG. 4.

The sub-DDNS managing unit 240 may include a synchronization unit 242 and a sub-DDNS extension unit 244.

The synchronization unit 242 synchronizes the main database 250 of the main DDNS 200 and the sub-database 330 of the sub-DDNS 300. Synchronization may be performed, for example, periodically. Hereinafter, data stored in the main database 250 and the sub-database 330 and the operation of the synchronization unit 242 will be described.

Referring to FIG. 3B, data stored in the main database 250 and the sub-database 330 is illustrated in a table. The main database 250 may include data on the identifier (ID), the IP address (IP), the sub-DDNS allocated to the equipment (sub ddns), and a status of the equipment (status). The sub-database 330 may include data on the identifier (ID), the IP address (IP), a survival count (alive), and a status of the equipment (status).

The synchronization unit 242 synchronizes the IP address and the status of the equipment 110 stored in the main database 250 and the sub-database 330 and the number of the equipment 110 stored in each of the sub-DDNS 300 at predetermined periods. If the contents of data of the two databases are different, whether to conduct the synchronization according to the data of the main database 250 or the data of the sub-database 330 may vary according to embodiments. Also, the synchronization unit 242 may not be included in the main DDNS 200 but in the sub-DDNS 300 according to another embodiment. Alternatively, the synchronization unit 242 may not belong to either the main DDNS 200 or the sub-DDNS 300 but may be a separate element. Mechanisms for synchronization are well known to those of ordinary skill in the art and thus a detailed description thereof will be omitted here.

The sub-DDNS extension unit 244 checks the number of pieces of equipment 110 registered to each of the sub-DDNS 300, and when the number of pieces of equipment 110 registered to a certain sub-DDNS 300 exceeds a predetermined reference value, the sub-DDNS extension unit 244 activates a preliminary sub-DDNS 300. The preliminary sub-DDNS 300 starts an operation in response to the control of the sub-DDNS extension unit 244, and the main DDNS 300 may allocate the equipment 110 that are newly registered to the subsequently added sub-DDNS 300 that are added thereafter. According to another embodiment of the present invention, when the number of pieces of equipment 110 registered to a certain sub-DDNS 300 exceeds a predetermined reference value, the sub-DDNS extension unit 244 may output a warning message saying that the capacity of the sub-DDNS 300 is almost used up. In this case, the manager of the DDNS 130 may additionally extend the sub-DDNS 300 after seeing the warning message.

The sub-DDNS 300 according to the current embodiment of the present invention may include a health check processing unit 310, a time-out processing unit 320, and a sub-database 330.

The health check processing unit 310 receives a status notifying message that is transmitted from the equipment 110 to conduct a health check. The health check processing unit 310 may include a first survival count updating unit 312 and a reregistering processing unit 314. When a status notifying message is received from a certain equipment 110, and when the survival count (alive) regarding the corresponding equipment 110 is less than a predetermined reference value and the status of the equipment 110 is active, the first survival count updating unit 312 sets the survival count regarding the corresponding equipment 110 as 0. The survival count (alive) is the value which represents how long the corresponding equipment 110 does not receive a status notifying message to the corresponding sub-DDNS. If the survival count (alive) of the equipment 110 is greater than a predetermined reference value or its status is inactive (status=0), the reregistering processing unit 314 reregisters the equipment 110. The reregistering processing unit 314 outputs a reregistering request message to the main DDNS 200, and the main DDNS 200 registers an identifier of the equipment 110 in the equipment registering unit 230 and allocates a sub-DDNS to the equipment 110, thereby reregistering the equipment 110. According to another embodiment, the reregistering processing unit 314 may reregister the equipment 110 to the sub-database 330 and reflect the reregistered information of the equipment 110 to the main database 250 later by synchronization.

An example of a status notifying message string transmitted to the sub-DDNS 300 in the equipment 110 is as follows:

| | |
|---|---|
| DIRALIVE BMSP/0.3\r\n | ; METHOD = DIRALIVE |
| ID:sst1\r\n | ; ID of equipment |
| IP:211.177.39.197\r\n | ; IP of equipment |
| HTTP_PORT:80\r\n | ; web port of equipment |
| PLATFORM: SNS-400\r\n | ; equipment Platform |
| \r\n\r\n" | ; string completion classifier |

A response string transmitted to the equipment 110 from the sub-DDNS 300 with respect to the status notifying message is as follows:

| | |
|---|---|
| "BMSP/0.3 200 OK\r\n | ; STATUS CODE and REASON |
| REFRESH: 3\r\n | ; Refresh Interval (minute) |
| \r\n\r\n" | ; string completion classifier |

The operation of the health check processing unit 310 will be described in detail below with respect to FIG. 5.

The time-out processing unit 320 changes the status of the equipment 110 that has not received a status notifying message in a normal manner for a predetermined time period as inactive. The time-out processing unit 320 may include a second survival count updating unit 322 and an equipment status updating unit 324. The second survival count updating unit 322 increases a survival count (alive) with respect to each piece of equipment 110 every time-out processing period. The equipment status updating unit 324 determines whether a survival count (alive) of each piece of equipment 110 exceeds a predetermined reference value every time-out processing period, and when the survival count (alive) of each of the equipment 110 exceeds a predetermined reference value, the status of the equipment 110 is set as an inactive status (status=0). The operation of the time-out processing unit 320 will be described in detail below with reference to FIG. 6.

Figure 4:
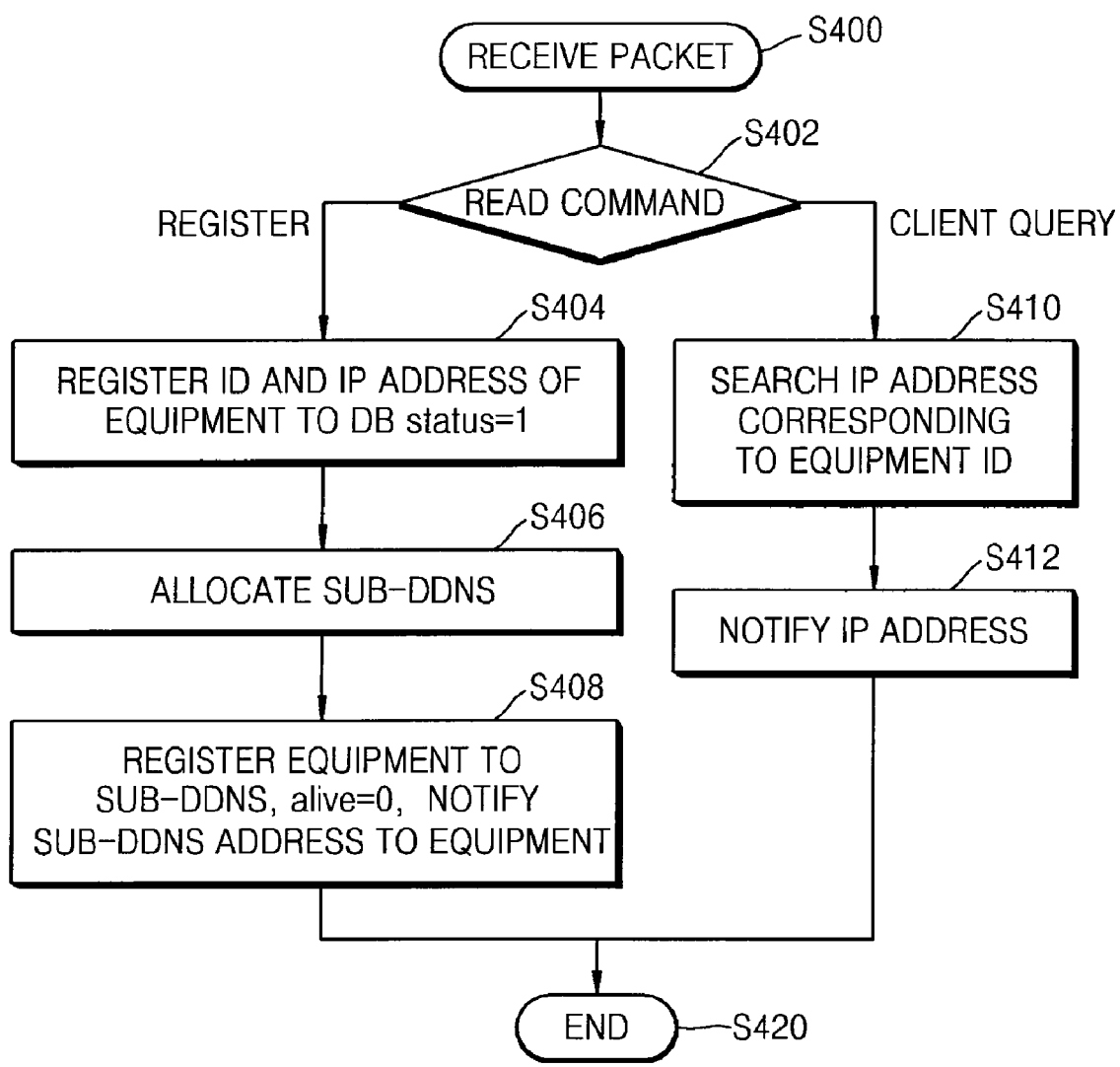
FIG. 4 is a flowchart illustrating operations of registering equipment and processing a client query according to an embodiment of the present invention.

FIG. 4 is a flowchart illustrating registering of equipment and processing of a client query according to an embodiment of the present invention.

When a command is received in operation S400, the main DDNS 200 reads the contents of the command in the command receiving unit 210. If the received command is for registering equipment, the received command is processed in the equipment registering unit 230. If the received command is for a client query, the received command is processed in the client query processing unit 220.

When the received command is a command for registering equipment, the ID registering unit 232 parses an identifier (ID) and an IP address (IP) of equipment in the received command string and registers the equipment 110 to the main database 250. Also, the status of the equipment 110 is registered as active (status=1) in operation S404. The main DDNS 200 allocates a sub-DDNS 300 with respect to the registered equipment 110 in operation S406. When the sub-DDNS 300 is allocated to the equipment 110, an identifier of the allocated sub-DDNS 300 is stored in the main database 250. Also, the equipment 110 is registered to the allocated sub-DDNS 300 in operation S408. Here, the ID and IP address of the equipment 110 are registered to the sub-database 330 of the corresponding sub-DDNS 300. Also, a survival count (alive) of a minimum value is set at a minimum, for example, alive=0, and the status is set active (status=1). The main DDNS 200 notifies the equipment 110 of the address and health check intervals of the allocated sub-DDNS 300.

When the received command is a client query, the IP address searching unit 222 parses an identifier of the equipment 110 from a client query, and the IP address of the equipment 110 is searched from the main database 250 in operation S410. If the corresponding equipment 110 is not registered to the main database 250 or the status of the equipment 110 is inactive, the main DDNS 200 responds to a client query and sends an IP address search failure message as a reply. When an IP address of the equipment 110 is searched from the main database 250, the IP address notifying unit 224 sends the IP address to the client as a reply in operation S412.

Figure 5:
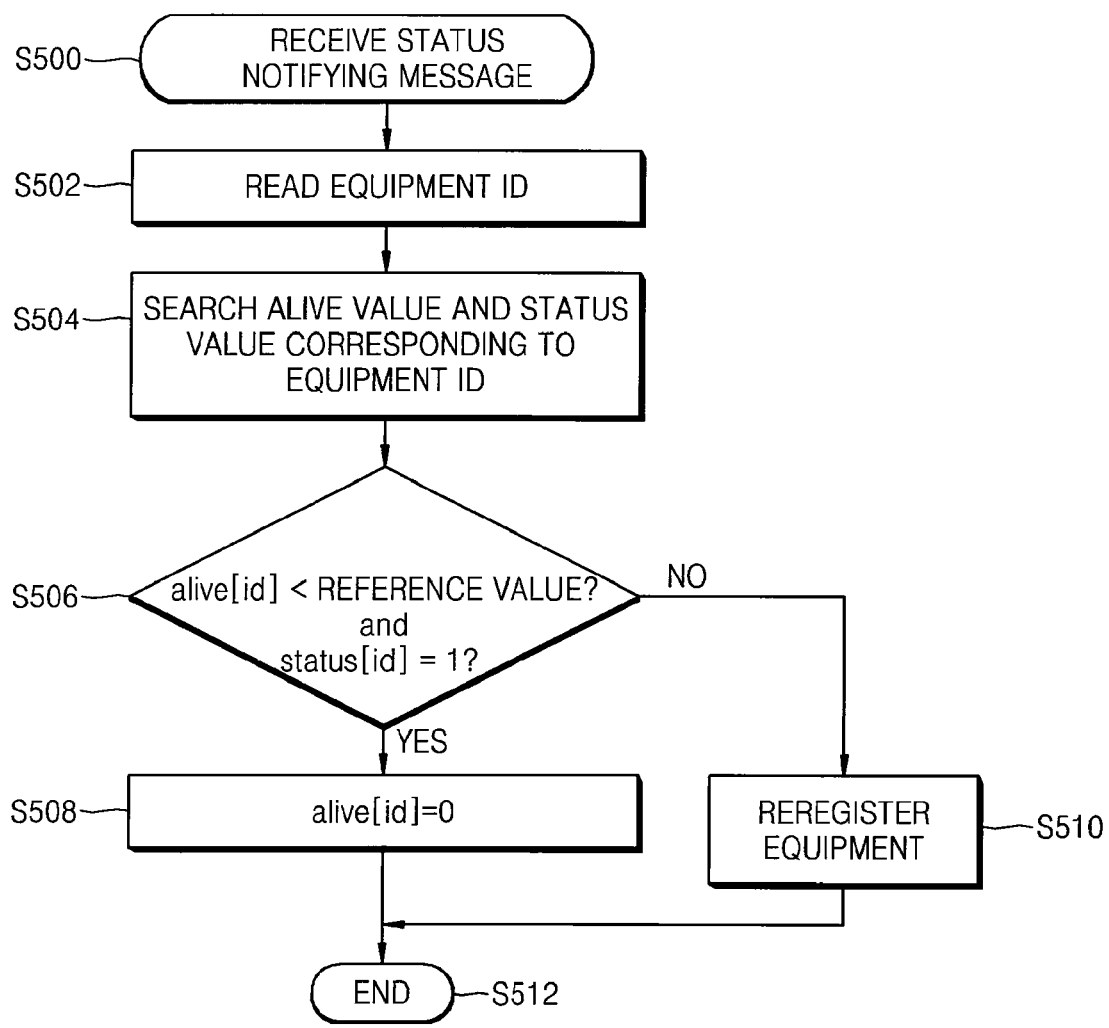
FIG. 5 is a flowchart illustrating a health check process according to an embodiment of the present invention.

FIG. 5 is a flowchart illustrating a health check process according to an embodiment of the present invention.

The health check process according to the current embodiment of the present invention is performed in the sub-DDNS 300. Upon receiving a status notifying message, the sub-DDNS 300 reads an identifier (ID) of the equipment 110 from the status notifying message in operation S502. Next, the sub-DDNS 300 searches a survival count (alive) value and a status value of the equipment 110 by using an ID of the equipment in operation S504. If the survival count (alive) is less than a predetermined reference value, and the status is active in operation S506, the sub-DDNS 300 sets a survival count (alive) value of the equipment 110 to a minimum value (e.g., 0) in operation S508. If the survival count (alive) is greater than a predetermined reference value or the status is inactive (operation S506), the reregistering processing unit 314 reregisters the corresponding equipment 110.

Figure 6:
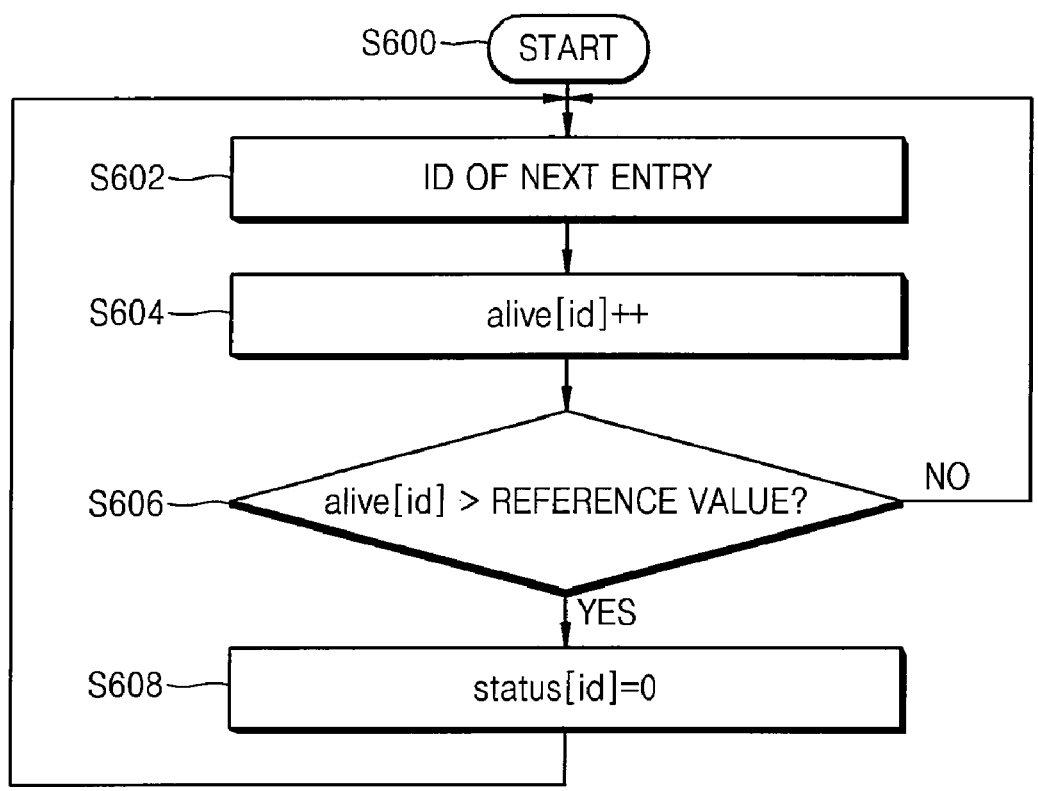
FIG. 6 is a flowchart illustrating a time-out process according to an embodiment of the present invention.

FIG. 6 is a flowchart illustrating a time-out process according to an embodiment of the present invention.

The time-out processing unit 320 further increases a survival count (alive) of the equipment 110 registered to the sub-DDNS 300, and changes a status value of the equipment 110, whose survival count (alive) value exceeds a predetermined reference value, to an inactive status.

The time-out processing unit 320 sequentially performs a time-out processing loop with respect to each piece of equipment 110 registered to the sub database 330 in operation S602. In operation S604, the second survival count updating unit 322 increases a survival count value of the equipment 110 that is being processed by the time-out process. When a survival count (alive) value of the corresponding equipment 110 exceeds a reference value in operation S606, the equipment status updating unit 324 sets the status value of the equipment 110 as inactive (status=0) in operation S608. After the time-out processing with respect to a certain piece of equipment is finished, time-out processing is repeated with respect to another piece of equipment.

According to the present invention, a unit performing a health check and a unit of registering equipment and processing a client query are separated to distribute a load on a dynamic domain name server caused by the health check, and thus registering of the equipment and processing of a client query can be conducted at higher speed.

Also, according to the present invention, since the capacity of a server can be increased dynamically as the number of pieces of equipment registered to the dynamic domain name server increases, it is prevented that the capacity of the dynamic domain name server is saturated and a load caused by the increased number of pieces of equipment can be distributed.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus comprising:
   a processor;
   a main dynamic domain name server (DDNS) that registers and stores an identifier and a dynamic IP address for a piece of equipment in a main database in communication with the main DDNS, and responds to a client query request with the dynamic IP address of the piece of equipment;
   and at least one sub-DDNS in communication with the main DDNS that receives a status notifying message from the piece of equipment that includes the identifier, searches for a survival count and a status corresponding to the identifier in a sub-database in communication with the sub-DDNS, and sets the survival count to a minimum value or reregisters the piece of equipment in response to the status notifying message sent from the piece of equipment;
   wherein the main DDNS comprises:
      a sub-DDNS allocation unit that allocates a sub-DDNS that is to perform a health check to notify whether the piece of equipment is operated normally to the piece of equipment; a sub-DDNS notifying unit that notifies the piece of equipment about a message including an address of the allocated sub-DDNS; and a synchronization unit that synchronizes the main database and the sub-database;
   wherein the main database including the identifier, the dynamic IP address, and the status for each of a plurality of pieces of equipment;
   wherein the at least one sub-DDNS includes the sub-database including the identifier, the IP address, the survival count, and the status of each of the plurality of pieces of equipment allocated to each sub-DDNS;
   wherein the main DDNS generates a warning message when a number of pieces of equipment in the plurality of pieces of equipment processed in the at least one of the sub-DDNS exceeds a reference value.

2. The apparatus of claim 1, wherein the main DDNS activates at least one other preliminary DDNS when a number of pieces of equipment in the plurality of pieces of equipment processed in the at least one of the sub-DDNS exceeds a reference value.

3. The apparatus of claim 1, wherein each of the at least one sub-DDNS includes a time-out processing unit that periodically increases the survival count of the piece of equipment registered in each of the at least one sub-DDNS and converts the status of the piece of equipment, whose survival count exceeds a reference value, to an inactive status.

4. The apparatus of claim 1, wherein each of the at least one sub-DDNS further includes a reregistering unit outputting a re-registration message that is configured to reregister the piece of equipment to the main DDNS when the survival count of the piece of equipment transmitting the status notifying message exceeds a reference value or the status of the piece of equipment is in an inactive status, and
   the main DDNS reregisters the piece of equipment according to the re-registration message.

5. A system for supporting a dynamic domain name, the system comprising:
   at least one piece of equipment;
   a client; and
   a dynamic domain name server (DDNS), wherein the DDNS comprises:
   a main dynamic domain name server (DDNS) that registers and stores an identifier and dynamic IP address for the at least one piece of equipment in a main database in communication with the main DDNS, and responds to a client query request with the dynamic IP address of the piece of equipment;
   and at least one sub-DDNS in communication with the main DDNS that receives a status notifying message from the piece of equipment that includes the identifier, searches for a survival count and a status corresponding to the identifier in a sub-database in communication with the sub-DDNS, and sets the survival count to a minimum value or reregisters the piece of equipment in response to the status notifying message sent from the piece of equipment;

wherein the main DDNS comprises:

a sub-DDNS allocation unit that allocates a sub-DDNS that is to perform a health check to notify whether the piece of equipment is operated normally to the piece of equipment; a sub-DDNS notifying unit that notifies the piece of equipment about a message including an address of the allocated sub-DDNS; and a synchronization unit that synchronizes the main database and the sub-database;

wherein the main database including the identifier, the dynamic IP address, and the status for each of a plurality of pieces of equipment;

wherein the at least one sub-DDNS includes the sub-database including the identifier, the IP address, the survival count, and the status of each of the plurality of pieces of equipment allocated to each sub-DDNS;

wherein the main DDNS generates a warning message when a number of pieces of equipment in the plurality of pieces of equipment processed in the at least one of the sub-DDNS exceeds a reference value.

6. The system of claim 5, wherein the at least one piece of equipment transmits a status notifying message to an address of the notified sub-DDNS.

7. The system of claim 5, wherein the main DDNS activates at least one other preliminary DDNS when a number of pieces of equipment in the plurality of pieces of equipment processed in the at least one of the sub-DDNS exceeds a reference value.

8. A method for supporting a dynamic domain name, the method comprising:

registering and storing an identifier and a dynamic IP address for at least one piece of equipment in a main database in communication with a main dynamic domain server (DDNS) in response to a register request from the at least one piece of equipment;

allocating a sub-DDNS that receives a status notifying message from the at least one piece of equipment that includes an identifier of the at least one piece of equipment, searches for a survival count and a status corresponding to the identifier in a sub-database in communication with the sub-DDNS, and sets the survival count to a minimum value or reregisters the at least one piece of equipment in response to the status notifying message sent from the at least one piece of equipment; and notifying the at least one piece of equipment about an address of the sub-DDNS allocated to the at least one piece of equipment;

periodically synchronizing the main database and the sub-database of the sub-DDNS;

wherein the main database including the identifier, the dynamic IP address, and the status for each of a plurality of pieces of equipment;

and the at least one sub-DDNS includes the sub-database including the identifier, the IP address, the survival count, and the status of each of the plurality of pieces of equipment allocated to each sub-DDNS;

wherein the main DDNS generates a warning message when a number of pieces of equipment in the plurality of pieces of equipment processed in the at least one of the sub-DDNS exceeds a reference value.

9. The method of claim 8, further comprising the step of updating the survival count of the at least one piece of equipment.

10. The method of claim 8, further comprising the step of resetting the survival count of the at least one piece of equipment in response to the status notifying message.

* * * * *